United States Patent [19]

Shirasawa et al.

[11] Patent Number: 4,859,342
[45] Date of Patent: Aug. 22, 1989

[54] PROCESS FOR INDUSTRIALLY SEPARATING BIOPOLYMERS

[75] Inventors: Honai Shirasawa, Ikeda; Hiroto Sugeno, Toshima; Shigeo Eto, Toshima; Hiroshi Saito, Toshima, all of Japan

[73] Assignees: Suntory Limited, Osaka; Soken Kagaku Kabushiki Kaisha, Tokyo, both of Japan

[21] Appl. No.: 217,878

[22] PCT Filed: Oct. 14, 1987

[86] PCT No.: PCT/JP87/00769
§ 371 Date: Jun. 14, 1988
§ 102(e) Date: Jun. 14, 1988

[30] Foreign Application Priority Data
Oct. 14, 1986 [JP] Japan .................................. 61-243353

[51] Int. Cl.$^4$ ............................................. B01D 15/08
[52] U.S. Cl. ..................................... 210/656; 210/635; 210/659
[58] Field of Search ............ 210/635, 656, 659, 198.2; 436/161; 422/70; 55/67, 386

[56] References Cited

U.S. PATENT DOCUMENTS

| | | | |
|---|---|---|---|
| Re. 29,454 | 10/1977 | Ashmead | 222/134 |
| 3,712,513 | 1/1973 | Ashmead | 222/134 |
| 3,799,396 | 3/1974 | Ashmead | 222/134 |
| 3,869,067 | 3/1975 | Ashmead | 222/134 |
| 4,478,713 | 10/1984 | Girot | 210/198.2 |
| 4,478,720 | 10/1984 | Perrut | 210/198.2 |
| 4,698,151 | 10/1987 | Ozawa | 210/198.2 |
| 4,699,718 | 10/1987 | Jones | 210/659 |
| 4,724,081 | 2/1988 | Kawahara | 210/659 |

*Primary Examiner*—Ernest G. Therkorn
*Attorney, Agent, or Firm*—Koda and Androlia

[57] ABSTRACT

A process and an apparatus for separating industrially a large amount of a biopolymer-containing sample by ion-exchange type column chromatography using the gradient elution method, wherein at least two precursor liquids for a mobile phase from liquid baths 3a and 3b are introduced into a mixing device 14 while the flow rate thereof is controlled over a wide range to obtain a mobile phase liquid. The mobile phase liquid thus obtained is introduced into the columns 1a and 1b so that the sample is separated in the columns and the biopolymer is collected in a fraction collector 6. The columns 1a and 1b are alternately regenerated.

2 Claims, 4 Drawing Sheets

PROCESS FOR INDUSTRIALLY SEPARATING BIOPOLYMERS

TECHNICAL FIELD

The present invention relates to industrial separation by ion-exchange type column chromatography and, more particularly, to a process for separating industrially a large amount of a mixed sample containing biopolymers by column chromatography, an apparatus used for the process and a controlling process thereof.

BACKGROUND ART

Recently, there have been frequently used an ion-exchange type column chromatographical method for the separation of biopolymers to a high purification level in the fields of chemistry, biology, agricultural chemistry, medicine, etc. The ion-exchange type column chromatography is one of the chromatographical methods which employ a filler as a stationary phase. When a sample of a mixture is placed on the top of an ionexchange resin column and developed with an appropriate electrolyte, adsorbed bands of components are caused to flow down separately from each other due to the differences of adsorptivities of respective component ions with respect to the filler. The mobile phase as a developing agent is an eluent. If developing operation, that is, elution, is continued, components are eluted in sequence depending on their adsorptivities, so that they can be collected in certain fractions. When biopolymers such as protein or the like are intended to be purified by separation, an eluent is fed onto the column in which a sample is placed with continuously changing of the salt concentration and/or pH of the eluent with the passage of the time to form a gradient of salt concentration and/or pH along the direction of the column length, and proteins are separately eluted by utilizing the differences of isoelectric points of proteins (gradient elution). Thus, it is necessary to perform gradient elution for the separation and purification of biopolymers such as proteins or the like by means of ion-exchange type column chromatography.

Conventional apparatuses for separating the sample of biopolymers on industrial scale by means of column chromatography are for the most part of a stepwise type comprising a column filled with a filler having ionexchange ability, at least 2 mobile phase baths provided at the upper stream side of the column through passages, a sample bath which will communicate with a sample injecting valve on injecting the sample, fraction collectors provided at the lower stream side of the column, a first detector for concentration and/or pH and a second detector for sample components provided on the passage between the column and the fraction collector, in which as used in bioprocess 3 to 5 baths of mobile phase liquids of which concentration and pH are preliminarily adjusted are provided as gradientors, and the valves of the baths are changed sequentially at a certain interval to perform gradient elution.

The processes of separating and purifying biopolymers such as protein or the like, in which the concentration and/or pH had linear gradients with high precision (within ±1%), were not of industrial scale. The conventional apparatuses for separating a biopolymer sample from the gradient column chromatographical system with high precision were proposed only for analytical use, and none of the apparatuses had such a large capacity as to be used on an industrial scale. However, due to the remarkable development of biotechnology in recent years, development of a process and apparatus of high performance and high reliability for separating and purifying a biopolymer has been desired.

The present invention has been achieved on the basis of the above described background. An object of the present invention is to provide a process for separating a biopolymer such as protein or the like from a high precision gradient system, an apparatus therefor and a controlling process thereof.

DISCLOSURE OF THE INVENTION

The present inventors have conducted researches for the processes for separating biopolymer samples from a high precision gradient of column chromatography and have built a variety of apparatuses therefor on a trial basis. As a result, they have found that the above mentioned object can be achieved by mixing continuously precursor liquids for preparing a mobile phase liquid while controlling the flow rate of each precursor liquid over a wide variable range of flow rate. The present invention has thus been accomplished. More specifically, the process for separating biopolymers on an industrial scale according to the present invention is characterized in that: a large amount of a biopolymer containing mixture sample is charged on the upper stream side of a column which has been filled with a filler having ion-exchange capability; a mobile phase liquid of a concentration and/or pH which are continuously changed with the passage of time is prepared by continuously mixing at least 2 precursor liquids for the mobile phase while the flow rate of each precursor liquid is controlled over a wide variable range of flow rate, specifically within a variable range of flow rate from 50:1 to 1,000:1; the mobile phase liquid thus obtained is pumped through the column to develop the components of the mixture in the column; and the fractions eluted from the lower stream side of the column are collected to separate the components of the mixture from each other.

According to the present controlling method, the following processes are carried out in sequence in the above mentioned industrial separation:

(i) a process which comprises pumping a buffer solution through a column into which a filler having ion-exchange capability has been charged to bufferize the column until it is confirmed that the measured value of the eluate from the column has been maintained within a predetermined range for a predetermined time after passage of a specific period of time from pumping the liquid whereupon the process is completed;

(ii) a process which comprises injecting a biopolymer containing a mixture sample into the column and finishing after passage of a specific period of time from the injection;

(iii) a process which comprises pumping a washing liquid into the column until it is confirmed for the observed value of the eluate from the column measured by a detector to be maintained within a predetermined range for a predetermined time after passage of a specific period of time from the pumping of the liquid;

(iv) a process which comprises preparing a mobile phase liquid the concentration and/or pH of which are/is continuously changed by controlling the ratios of pumping flow rate of respective liquids for the mobile phase according to the preliminarily established program, pumping the mobile phase liquid into the column to develop the components of the sample within the column, and collecting the eluate from the lower stream side of the column in fractions so that components of the sample are separated from each other, in which fractionation is started after passage of a certain period of time from the start of the process or when the observed value exceeds a predetermined value;

(v) a process which comprises pumping a wash-out liquid into the column to wash out unnecessary components from the column until it is confirmed for the observed value of the eluate from the column measured by a detector to be maintained within a predetermined range for a predetermined time after passage of a specific period of time from pumping the liquid;

(vi) a process which comprises pumping regenerating liquids having different concentrations sequentially into the column until it is confirmed that the observed value of the eluate from the column measured by a detector has been maintained within a predetermined range for a predetermined time after passage of a certain period of time from pumping the liquid; and (vii) a process which comprises pumping a cleaning liquid into the column for a predetermined time.

In a preferred mode of the controlling process according to the present invention, it is possible to select the following operations during carrying out the gradient process (iv), (a) an operation for altering the program which is intended to change the concentration and/or pH of a mobile phase liquid continuously with the passage of time;

(b) an operation for skipping the process in practice without stopping the pumping of the liquid;

(c) an operation for maintaining the operation under the conditions at that point of time; and (d) an operation for stopping temporarily the gradient process in practice.

The apparatus used for the separating process of the present invention is an industrial separation apparatus for separating a large amount of biopolymer containing mixture sample by means of column chromatography and is characterized in that it comprises a column filled with a filler having ion-exchange ability, at least 2 baths of precursor liquids for a mobile phase, which baths are provided at the upper stream side of the column through a passage, a sample injecting valve provided on a passage between the column and the precursor baths, a sample bath which will be communicated with the sample injecting valve on injecting the sample, a fraction collector provided at the lower stream side of the column, a first detector for concentration and/or pH and a second detector for sample components provided on the passage between the column and the fraction collector, a column changing valve provided at a passage between the column and the precursor liquid baths, a column regenerating liquid bath which will be communicated with a column changing valve on regeneration of the column, liquid pumping apparatuses provided at the lower stream side of each precursor liquid bath, which apparatuses can control the flow rate of each precursor liquid within the variable range of 50:1 to 1,000:1, and a mixing device for continuously mixing the precursor liquids pumped from the respective pumping apparatuses and pumping the mobile phase liquid thus obtained to the column.

In a preferred mode of the present invention, the above-mentioned controlling process and the apparatus can be controlled by means of a microcomputer.

According to the present invention, the following effects can be obtained:

The flow rate varies over a wide range, so that gradient precision can be increased and the resolving capability of the column can be improved.

In a preferred mode of the present invention, detectors for salts and/or pH and for sample components are provided also in the passage of the eluent during the regeneration of the column and is monitored and controlled by means of a microcomputer. Thus, not only separation in operating state during gradient elution but also regeneration of the column can be performed automatically, so that chromatographical separation and purification procedure over a long term can be repeated automatically. Accordingly, the process for separating proteins, which often requires a week for one cycle, will not need an overnight process as in conventional operations and can be operated automatically without workers for twenty-four hours.

Biopolymers are mostly separated in a sterile cold room (at ca. 4° C.) because of their physiological activities. However, the process of the present invention is monitored and controlled by means of a microcomputer and remote control can be achieved, so that the number of openings of the door of the sterile cold room will be reduced to enhance the operating efficiency.

According to another mode of the present invention, the separation process can be performed safely by further providing sensors of abnormal pressure, liquid exhaustion or the like.

According to a further preferred mode of the present invention, it is possible to employ two or more columns, one of which is used for gradient elution, and the other is used for column regenerating operation or the like. Moreover, these systems can be controlled automatically, and thus the time required for separation and purification can be reduced steeply.

According to further preferred mode of the present invention, a separating condition predetermined at the beginning in the computer control can be changed at an intermediate point, so that the initial conditions which are the scale-up of the separating conditions on a laboratory scale can be modified to reduce the failures in separation and purification and to prevent the loss of the valuable sample as far as possible.

According to a preferred mode of the present invention, the apparatus has a function of monitoring respective steps and judging the completion of the steps thus leading to high reproducibility.

BEST MODE FOR PRACTICING THE INVENTION

Figure 1:
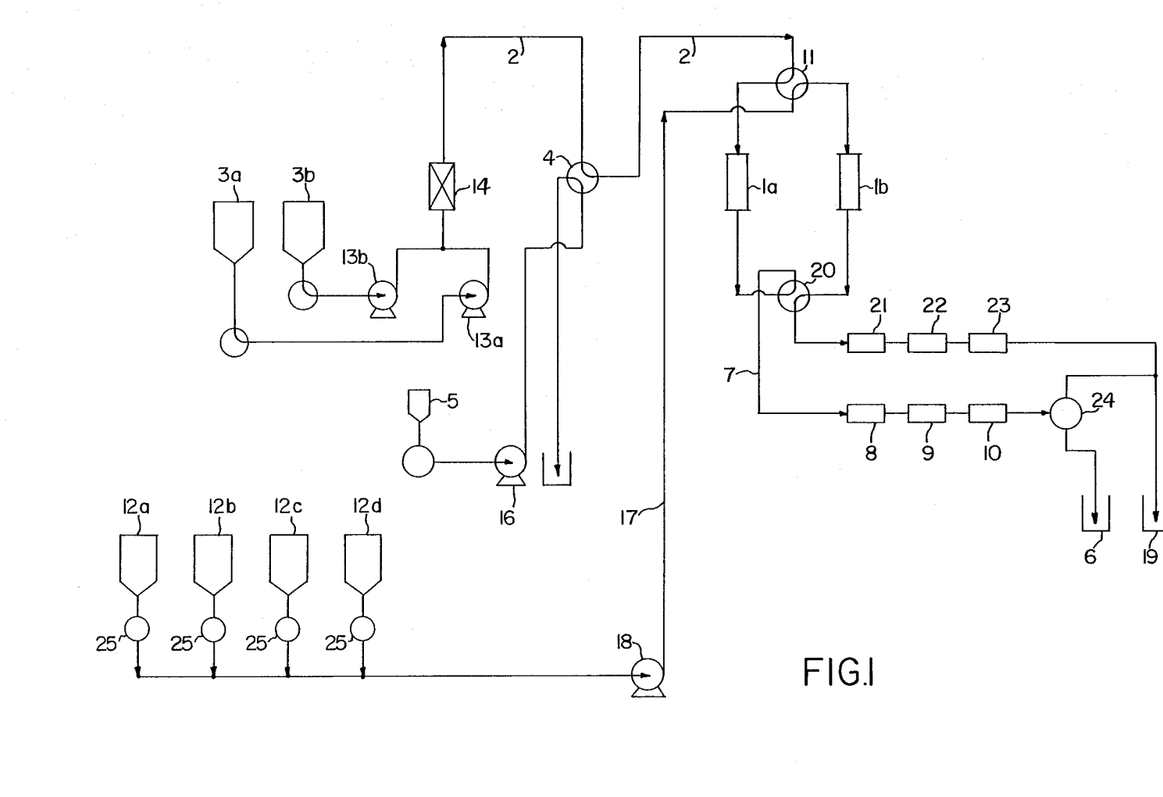
FIG. 1 is a flow sheet illustrating an example of the separating apparatus of the present invention.

The separation process of the present invention and an apparatus therefor will be described in detail with reference to the flow sheet in FIG. 1 which illustrates an embodiment of the separating apparatus according to the present invention.

The apparatus of this embodiment is an industrial separation apparatus for separating a large amount of biopolymer containing mixture sample by column chromatography, wherein it primarily comprises columns 1a and 1b filled with a filler having ion-exchange capability, two baths 3a and 3b of precursor liquids for a mobile phase, which baths are provided respectively at the upper stream side of the columns 1a and 1b through a passage 2, a sample injecting valve 4 provided on the passage 2 between the columns 1a and 1b and the precursor liquid baths 3a and 3b, a sample bath 5 which will be communicated with the sample injecting valve 4 on injecting the sample, a fraction collector 6 provided at the lower stream side of the columns 1a and 1b, first detectors 8 and 9 for concentration and/or pH and a second detector 10 for sample components provided on the passage 7 between the columns 1a and 1b and the fraction collector 6, a column changing valve 11 provided at the passage 2 between the columns 1a and 1b and the precursor liquid baths 3a and 3b, column regenerating liquid baths 12a, 12b, 12c and 12d which will be communicated with a column intended to be regenerated through the column changing valve 11 on regeneration of the column, liquid pumping apparatuses 13a and 13b provided at the lower stream side of precursor liquid baths 3a and 3b, respectively, which apparatuses can control the flow rate of each precursor liquid within the variable range, and a mixing device 14 for continuously mixing the precursor liquids pumped from the respective pumping apparatuses 13a and 13b and pumping the mobile phase liquid thus obtained to the column. Furthermore, in this apparatus, there are provided a sample pumping device 16 on a passage 15 between the sample injecting valve 4 and the sample bath 5 and a pumping device 18 for regenerated liquid on the passage 17 between the column changing valve 11 and the regenerated liquid baths 12a, 12b and 12c. Further there are provided a switch-over valve 20 which will communicate a column under gradient operation with the fraction collector 6 and communicate a column under regeneration procedure with a drain 19 at the lower stream of the columns 1a and 1b, and the first detectors 21 and 22 for concentration and pH and the second detector 23 for sample components on the passage between the drain 19 and the switch-over valve 20.

The subject for separation in the present invention is biopolymers which can be separated from each other by gradient procedure of ion-exchange chromatography including proteins such as interferon, interleukin, tissue plasminogen, activator (TPA), coronin stimulating agent (CSE), human immunoglobulin or the like; a variety of enzymes or the like.

The filler used in the present process and apparatus comprises a filler having ion-exchange capability including, for example, strong acidic cationic exchange types (SP), weak acidic cationic exchange types (CM), strong basic anionic exchange types (QAE) and weak basic anionic exchange types (DEAE). The filler has a particle diameter in the range of exceeding 5μ, preferably from several ten to several hundred micrometers taking account of the practice on an industrial scale.

The column used in the present invention is preferably a moderate or low pressure chromatographical column having a large capacity in which a large amount of sample may be treated, for example a column having a capacity of 1 liter to 100 liters. A plural number of the columns may be used, in which case they are arranged in series and in parallel as shown in FIG. 1, so that gradient elution of a sample can be carried out in one of the columns while regeneration is carried out in another column.

In the separating process of the present invention, the mobile phase liquid is obtained by mixing at least 2 precursor liquids for mobile phase and generally comprises an aqueous solution, to which organic solvents may be added. The mobile phase liquids are selected appropriately according to the ion-exchange resins, properties of a sample or the like, and an anionic buffer is used for a cationic ion-exchange resin while a cationic buffer is used for an anionic ion-exchange resin. The buffers used for ion-exchange chromatography of biopolymers include, for example, Tris hydrochloride, Tris phosphate, and phosphate buffers. In ion-exchange chromatography, ionic strength (concentration), pH, retention value, elution time or other factors are finely varied, so that a mobile phase liquid in which concentration and/or pH are/is continuously changed with the passage of time is prepared by mixing continuously at least 2 precursor liquids for mobile phase in the variable flow rate range of 50:1 to 1,000:1 with controlling of the flow rate of the liquids. The mobile phase liquid is prepared in the pumping devices 13a and 13b which are provided at the lower stream side of the respective precursor liquid baths 3a and 3b and can control the flow rates of the respective precursor liquids in the variable flow rate range of 50:1 to 1,000:1 and in the mixing device 14 in which the respective precursor liquids pumped from the above-mentioned pumping devices 13a and 13b are continuously mixed and pumped to the column. A preferred embodiment of the pumping device of the invention includes a diaphragm type pump having a wide flow rate range (from 1 ml/min to several l/min) and quantification capability with no pulse and high pressure. More preferably, the pump has a non-metallic liquid contact portion having sanitariness The respective pumping devices have a wide variable flow rate range of 50:1 to 1,000:1, so that the linearity of concentration gradient, that is, the precision of the gradient elution is improved to a high level within ±1% and thus is extremely effective for the separation of proteins having similar isoelectric points to each other. Then, the mixing device used in the present invention pumps the respective precursor liquids which have been supplied from the pumping device (pump) to the column. The mixing device for such continuous mixing is, for example, a static mixer. Ordinary mixers have fixed capacities, and thus a mixer having a capacity corresponding to a pumping flow rate must be provided. Moreover, lag time may be produced due to an excessively large internal volume as compared to a flow rate, while the residence time of the precursor liquids in the mixer will be too short to mix them satisfactorily. Mixing will be performed very smoothly by means of a mixer for continuous mixing such as a static mixer or the like and lag time due to excessively long residence time will not be produced.

The first detectors used in the present invention detect the levels of the concentration and/or pH of the mobile phase liquid and send them out as signals. Examples of such detectors are a conductometer, a polarograph, and a pH meter. On the other hand, the second detector detects the existing levels of sample components, particularly biopolymers and sends them out as signals. Examples of such a detector are an ultraviolet spectrophotometer (UV), a differential refractometer (RI), a fluorophotometer (FP), and an infrared spectrophotometer (IR).

If the procedure of separating biopolymer by ion-exchange chromatography is to be conducted repeatedly, an operation for reusing the column is carried out after the gradient procedure. The operation includes regeneration, bufferization, washing and sterilization steps of a column. Reagents used therefor include organic solvents such as alcohols or the like, salts such as sodium hydroxide, hydrochloric acid, Tris-hydrochloride sodium chloride or the like, and other agents.

Next, the handling and operation of the apparatus shown in FIG. 1 will be described in the following.

As preliminary steps for the separating operation, the column 1a is washed, regenerated and bufferized, and a biopolymer containing mixture sample is placed in the sample bath 5. At the same time, buffer solutions having concentrations and/or components which are different from for mobile phase 3a and 3b, respectively. First of all, the valves 4 and 11 are placed in such a state that the sample bath 5 and the column 1a communicate with each other, and the sample is pumped rom the sample bath 5 by working the pump 16 and charged into the top of the column 1a through the passage 2. Then, the valve 4 is switched over so that the precursor liquid baths for mobile phase 3a and 3b and the column 1a will communicate with each other. The pumps 13a and 13b are driven, and respective precursor liquids for mobile phase are mixed amply and without stagnation in the mixing device by controlling the flow rates. The mobile phase liquid produced in the mixing device is pumped to the column 1a through the passage 2 and the valves 4 and 11. The flow rate is controlled by the pumps 13a and 13b, so that the concentration and/or pH of the mobile phase liquid are/is continuously changed with the passage of time. Thus, the sample in the column will be subjected to gradient operation. The sample components and mobile phase liquid eluted from the column 1a are passed through the valve 20 and the passage 7 to the conductometer (CD) 8, the pH meter 9 and the UV meter 10 which monitor the concentration and pH of the mobile phase liquid and the sample components. From the result of the measurements, the gradient of concentration/pH and the presence of the objective components can be judged. If the objective component is eluted, the fraction containing the aimed component is collected in the fraction collector 6. Unnecessary fractions are discharged through the drain 19. In this apparatus, the column 1b is also provided in parallel to the column 1a. Thus, the column 1b can be subjected to regeneration process in order to reuse the column 1b. For example, methanol for sterilization is stored in the column regenerating liquid bath 12a, purified water in the column regenerating liquid bath 12b, a sodium hydroxide solution for removing impurities in the column regenerating liquid bath 12c, and a sodium chloride solution for bufferization in the column regenerating liquid bath 12d. The liquid in one of the column regenerating liquid baths is pumped into the column 1b by means of the pump 1B depending on the respective steps of the regeneration, bufferization, washing or sterilization of the column. The respective steps of the regeneration, bufferization and washing or sterilization of the column are monitored with the conductometer (CD) 21, the pH meter 22 and the UV meter 23 provided upper stream of the drain 19. If gradient procedure is finished in the column 1a, which requires regeneration, and the gradient procedure is to be conducted sequentially with the column 1b, it is possible to perform the procedure by changing the states of the valves 11 and 20.

Figure 2:
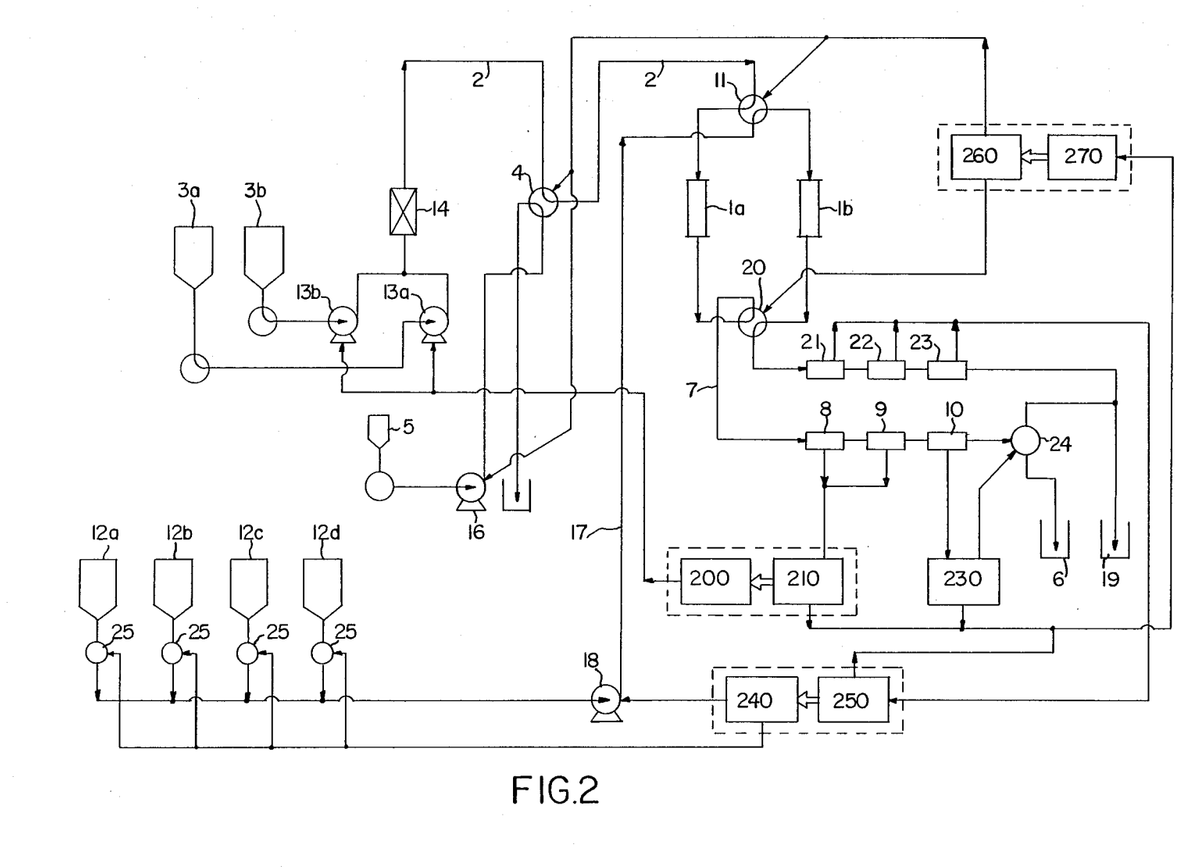
FIG. 2 is a flow sheet illustrating another example of the separating apparatus.

Next, a mode of the separating apparatus by applying a microcomputer will be described. The flow sheet of the example is illustrated in FIG. 2. In this example, a system of control by a microcomputer is added to the separating apparatus of FIG. 1. That is to say, there are provided flow rate control means 200 which controls the output of the pumps 13a and 13b by flow rate control signals, gradient control means 210 for sending the flow rate control signals to the flow rate control means 200 in response to the detected signals and/or predetermined values from the first detectors, peak judging means 230 for sending fractionating signals at the time when a component peak in the eluate is evaluated from the detection signals from the second detector 2 and the measured value exceeds a predetermined level or for sending fractionating signals after passage of a predetermined time from beginning of gradient procedure, a fractionating valve 24 for switching over the direction of the flow into the fraction collector in response to the fractionating signals, column reuse control means 240 for controlling the valve 24 of the column regeneration bath and the pump 18 in response to regeneration control signals, column reuse control means 250 for judging the termination of respective column reuse processes by evaluating the detection signals from the detectors 21, 22, and 23 to send the regeneration control signals, process change judging means 270 for judging whether the process is switched over to the sample injection process, gradient process or column reuse process in response to the flow rate control signals, the fractionating signals and the regeneration control signals, respectively and sending switch-over signals, and switch-over control means 260 for controlling the outputs of the pump 16 by switching over the valves 4, 11 and 20.

Figure 3:
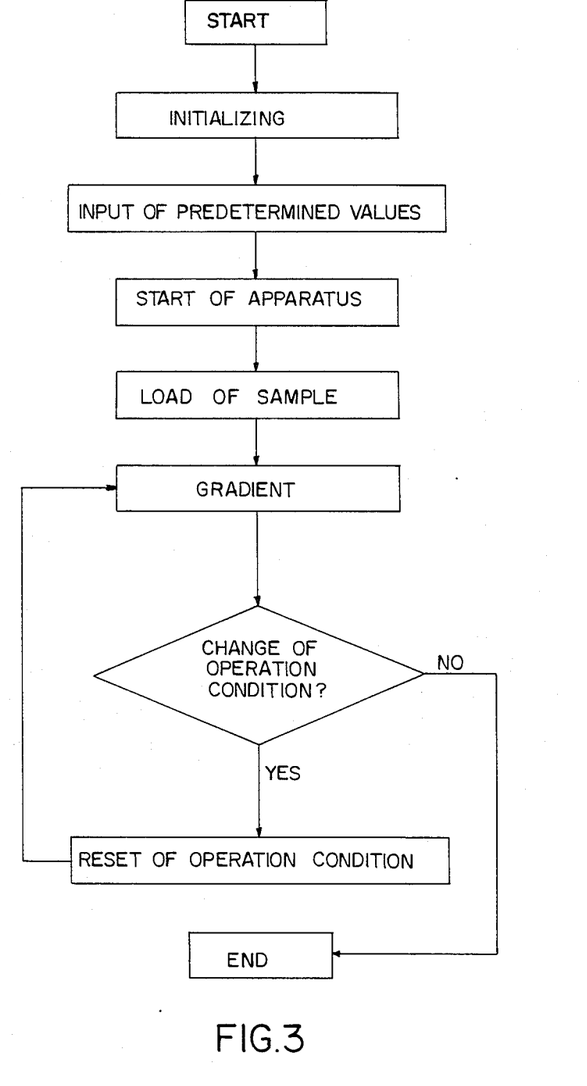
FIG. 3 is a flow chart illustrating a mode of performing the separation process of the present invention.

An example of controlling the working operation of the separating apparatus containing the control system is illustrated in FIG. 3.

According to this control sequence, the state of the separating apparatus in which the gradient procedure may be initiated is confirmed. Next, the predetermined values for the control are loaded as inputs. The predetermined values include the flow rates and the working time of the pump 13a and 13b and the like. The apparatus will start after the input of the predetermined values. The switch-over signal operates the pump 16 to load the sample into the column 1a. The valve 4 is switched over by the switch-over signal, and the pumps 13a and 13b are operated by the flow rate control means 200 to load the mobile phase liquid into the column. The eluate is eluted from the column and detected by the second detector. The component peak in the eluate is evaluated from the detection signals; fractionating signals are sent from the peak judging means to the fractionating valve; and the fractionating valve is switched over to fractionate desired fractions into the fraction collector. Peaks may be judged, for example, in level mode or peak mode, or a combination thereof. It is also possible to change the gradient during the gradient procedure or to change the operation condition so that the concentration will be once held during the procedure.

Furthermore, the processes such as regeneration, bufferization, and washing of the column are controlled in the same manner as above, and a step switch-over process will be also controlled in the same manner.

Figure 4:
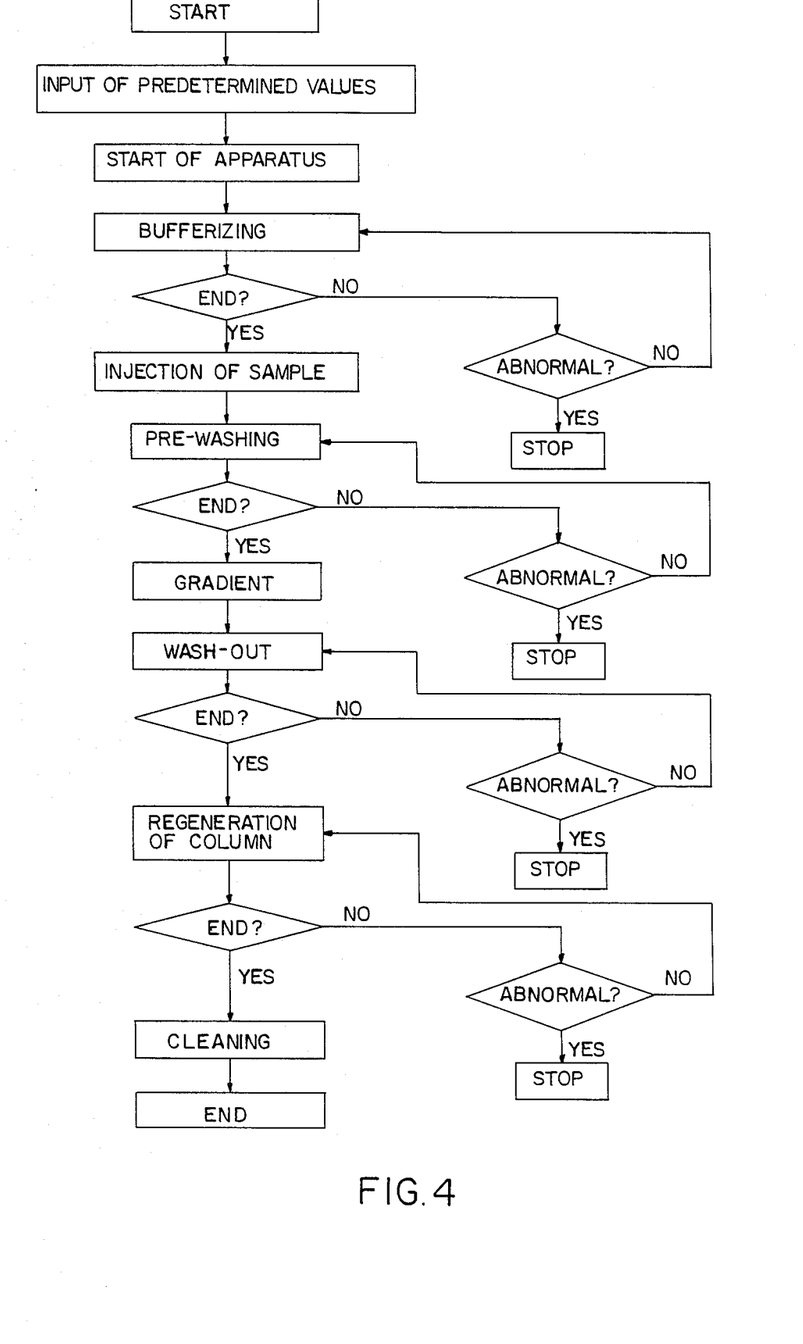
FIG. 4 is a flow chart illustrating a mode of performing the controlling process of the present invention.

The controlling process according to the present invention will be described with reference to the flow chart in FIG. 4.

According to this control sequence, the state of the separating apparatus in which the gradient procedure can be initiated is confirmed. Next, the predetermined values for the control are introduced as inputs. The predetermined values include the flow rate, predetermined time and the upper and lower limits of output signals from the detector in a bufferization step, the flow rate and predetermined time in a sample injection step, the gradient condition, flow rate and predetermined time in a gradient step, the flow rate, predetermined time and the upper and lower limits of output signals from the detector in a washing out step, the predetermined time in a cleaning step and the like.

The apparatus starts operating after the input of the predetermined values.

After the apparatus is started, the bufferization liquid is pumped to the column which has been charged with a filler having ion-exchange capability to bufferize the column, and the bufferization step is terminated by confirming the detected value of the eluate from the column by means of a detector having been maintained within a predetermined range for a predetermined time. If the terminating conditions are not satisfied and abnormality is not present, the bufferization step is repeated or maintained. If abnormality is observed, the operation is immediately stopped. Termination of the bufferization step and the following steps of prewashing, washing-out and column regeneration is judged from whether the measured values from the detector have been maintained within the predetermined range as described above. Accordingly, when the measured values (output signals) from the detector are not within the predetermined range or are within the predetermined range only for a short time after the predetermined time from the initiation of sending the liquid, the sending of the liquid will not be terminated.

After the bufferization step, a biopolymer containing mixture sample is injected into the column and the injection step is terminated after the predetermined time from the injection.

After injection of the sample, the washing liquid is pumped into the column. The pre-washing step is terminated by confirming the measured values of the column eluate by the detector which have been maintained within the predetermined range for the predetermined time after the passage of the predetermined time since pumping of the washing liquid.

After the pre-washing step, a mobile phase liquid is prepared by controlling the flow rate ratio of respective liquids for mobile phase according to the predetermined program and pumped into the column to develop the components of the sample through the column. The eluates from the lower stream side of the column are collected in fractions to separate the components of the sample. In this step, fractionation is started after passage of the predetermined time from the initiation of the step or at the time when the detected value exceeds the predetermined value.

The program previously established in this step is the one for gradient condition, and according to this program the concentration and/or pH of the mobile phase liquid are/is continuously changed with the passage of time in a linear mode (linear gradient) or a stepwise mode (step gradient) or in a combination thereof. During this step, it is also possible to add to the step (a) an operation for altering the program for continuously changing the concentration and/or pH of the mobile phase liquid with the passage of time, (b) an operation for skipping the step in practice without stopping the pumping of the liquid, (c) an operation for maintaining the working under the condition at the point, and (d) an operation for temporarily stopping the gradient procedure in practice.

After the gradient step, a wash-out liquid is pumped into the column, and the wash-out step is terminated by confirming the detected value of the column eluate which has been maintained within the predetermined range for the predetermined time.

Next, regenerating liquids having different concentrations are sequentially pumped into the column, and the regeneration step is terminated by confirming the detected value of the column eluate which has been maintained within the predetermined range for the predetermined time.

Finally, a cleaning liquid is pumped into the column for a predetermined time.

INDUSTRIAL APPLICABILITY

According to the present invention, separation and purification of biopolymers of a high level by ion-exchange type column chromatography can be applied on an industrial scale.

We claim:

1. A process for controlling the industrial separation of a biopolymer by column chromatography, in which a large amount of a biopolymer-containing mixture sample is charged into the upper stream side of a column filled with a filler having ion-exchange capability; a mobile phase liquid the concentration and/or pH of which continuously vary/varies with the passage of time is prepared by continuously mixing at least 2 precursor liquids for the mobile phase while controlling the flow rate of each precursor liquid over a wide variable range of flow rate; the mobile phase liquid thus obtained is pumped through the column to develop the components of the mixture in the column; and the fractions eluted from the lower stream side of the column are collected to separate the components of the mixture from each other, said process comprising sequentially conducting the following steps:

(i) a step of pumping a buffer solution through a column in which a filler having ion-exchange capability has been charged to bufferize the column until it is confirmed that the observed value of the eluate from the column has been maintained within a predetermined range for a predetermined time after passage of a specific period of time from the pumping of the liquid;

(ii) a step of injecting a biopolymer-containing mixture sample into the column and finishing after passage of a specific period of time from the injection;

(iii) a step of pumping a washing liquid into the column until it is confirmed that the observed value of the eluate from the column measured by a detector has been maintained within a predetermined range for a predetermined time after passage of a specific period of time from the pumping of the liquid;

(iv) a step of preparing a mobile phase liquid the concentration and/or pH of which are/is continuously varied by controlling the ratios of pumping flow rate of respective liquids for mobile phase according to a predetermined program, pumping the mobile phase liquid into the column to develop the components of the sample within the column and collecting the eluate from the lower stream side of the column in fractions so that components of the sample are separated from each other, in which fractionation is started after passage of a specific period of time from the start of the process or when the observed value exceeds the predetermined value;

(v) a step of pumping a washing-out liquid into the column to wash out unnecessary components from the column until it is confirmed that the observed value of the eluate from the column measured by a detector has been maintained within a predetermined range for a predetermined time after passage of a specific period of time from the pumping of the liquid;

(vi) a step of pumping regenerating liquids having different concentrations sequentially into the column until it is confirmed that the observed value of the eluate from the column measured by a detector has been maintained within a predetermined range for a predetermined time after passage of a specific period of time from the pumping of the liquid; and (vii) a step of pumping a cleaning liquid into the column for a predetermined time.

2. A process for controlling the separation according to claim 1, wherein the following operations are selected during carrying out of the gradient step (iv);

(a) an operation for altering the program which is intended to vary the concentration and/or pH of the mobile phase liquid continuously with passage of time;

(b) an operation for ending early the process in practice without stopping the pumping of the liquid;

(c) an operation for maintaining the process operation under the conditions at that point of time; and (d) an operation for stopping temporarily the gradient process during practice of the process operation.

* * * * *